(12) United States Patent
Enberg et al.

(10) Patent No.: US 7,677,654 B2
(45) Date of Patent: Mar. 16, 2010

(54) FOLDABLE ARMREST

(75) Inventors: Mikael Enberg, Åkersberga (SE); Magnus Fridsell, Sollentuna (SE); Fredrik Löfgren, Järfälla (SE); Pelle Reinius, Enskede Gård (SE); Jan Marcus Gabrielsson, Stockholm (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/576,886

(22) PCT Filed: Sep. 16, 2005

(86) PCT No.: PCT/SE2005/001349

§ 371 (c)(1), (2), (4) Date: Apr. 23, 2008

(87) PCT Pub. No.: WO2006/038847

PCT Pub. Date: Apr. 13, 2006

(65) Prior Publication Data

US 2008/0265646 A1    Oct. 30, 2008

(30) Foreign Application Priority Data

Oct. 7, 2004    (SE)    .................................... 0402442

(51) Int. Cl.
*B60N 2/46*    (2006.01)

(52) U.S. Cl. .................. 297/115; 297/116; 297/411.32; 297/411.33; 297/411.35; 297/411.37

(58) Field of Classification Search .............. 297/411.3, 297/411.32, 411.33, 411.34, 411.35, 411.36, 297/411.37, 115, 116
See application file for complete search history.

(56) References Cited

U.S. PATENT DOCUMENTS 1,894,621 A * 1/1933 Lehman ...................... 297/115

(Continued)

FOREIGN PATENT DOCUMENTS

DE    3432084 A1    3/1986

(Continued)

OTHER PUBLICATIONS

International Search Report for corresponding International Application PCT/SE2005/001349.

*Primary Examiner*—Rodney B White
(74) *Attorney, Agent, or Firm*—WRB-IP LLP (57) ABSTRACT

An armrest for a vehicle seat includes a seat cushion and a backrest. The armrest is intended to be turned around a pivot axis between a first active position and a second folded-away position. The armrest includes an upper part, which in the active position is positioned with its longitudinal axis substantially parallel to a substantially vertical plane through a side surface constituting an outer edge surface of the vehicle seat and intended to support a user's forearm, and at least one lower part provided with a fixing device for attaching the upper part to the vehicle seat. The lower part includes a linking mechanism arranged for setting the upper part in a transverse direction between a first position outside the side surface and an adjustable second position, and a locking device that is arranged to activate a catch that locks the upper part in a set position after it has been moved to the second position. A vehicle seat provided with an armrest and to a vehicle including an armrest are also provided.

14 Claims, 6 Drawing Sheets

U.S. PATENT DOCUMENTS

| | | | | |
|---|---|---|---|---|
| 4,085,967 | A * | 4/1978 | Spencer | 297/115 |
| 4,159,145 | A * | 6/1979 | Quakenbush | 297/113 X |
| 4,917,438 | A * | 4/1990 | Morgan | 297/411.37 |
| 5,104,191 | A * | 4/1992 | Tame | 297/411.32 |
| 5,290,092 | A * | 3/1994 | Geer | 297/411.32 |
| 5,730,458 | A * | 3/1998 | Byon | 297/411.32 X |
| 5,909,864 | A * | 6/1999 | Wang | 297/411.33 X |
| 6,217,119 | B1 * | 4/2001 | Cook et al. | 297/411.32 |
| 6,471,297 | B1 * | 10/2002 | Runde et al. | 297/411.32 |
| 7,261,369 | B2 * | 8/2007 | Ahad | 297/116 X |
| 7,296,858 | B2 * | 11/2007 | Ruspa | 297/411.32 |
| 7,469,964 | B2 * | 12/2008 | Baumann | 297/411.33 X |

FOREIGN PATENT DOCUMENTS

| | | | |
|---|---|---|---|
| FR | 2816898 A1 | 5/2002 | |
| JP | 57104423 A * | 6/1982 | 297/411.32 |
| SE | 9901595 A | 11/2000 | |

* cited by examiner

FOLDABLE ARMREST

BACKGROUND AND SUMMARY

The present invention relates to an armrest for use together with a seat in a vehicle. The invention also relates to a vehicle seat provided with such an armrest and a vehicle comprising such an armrest.

The invention is applicable to different types of vehicle, but in the following, for the purpose of illustration but not for the purpose of restricting the protection provided by the patent, it will be described how the armrest can be used in a working vehicle, such as a wheeled loader. Vehicles of the wheeled loader type are often provided with equipment for simple and comfortable operation. For example, the control of the vehicle can be carried out using a lever that is mounted on an armrest so that the operator who is seated in a driver's seat can at the same time rest his arm on the armrest and control the vehicle by means of the lever. Also other functions, such as control of the gearbox to select different gears or to change between driving the vehicle in a forward and backward direction, can be integrated into the armrest and can be operated by means of buttons or other types of controls arranged on the armrest.

The armrest, that is often mounted on the left side of the driver's seat viewed in the direction of travel, can usually be folded backwards from an essentially horizontal or slightly inclined forwards operating position to a more or less vertical folded-away passive position so as not to take up space in the vehicle between the driver's seat and the steering wheel when the driver is climbing in and out. In addition, the armrest often has a mechanism for setting the position of the armrest in relation to the driver's seat in a forward and backward direction so that the driver can individually select the required operating position of the armrest and thereby of the control lever.

A problem with previously-known armrests is that they do not sufficiently take into account variations in the body size of different operators. This means that the working position for the operator is only optimal for operators that are a particular body size, as the required distance between the sitting position (that is essentially the same for different operators) in the driver's seat, and the arm's support position on the armrest for the operator in a horizontal direction at right angles to the vehicle's direction of travel, that is sideways, varies from person to person. An unfavourable working position can result in the operator finding it more difficult to carry out the work, and there is also a danger of strain injuries.

An additional problem is that an adjustment of the armrest sideways usually results in a conflict with the armrest's folding movement in the upward/backward direction in association with the driver climbing out of the vehicle. In addition, a new sideways adjustment will be required when the armrest is folded down after the driver has climbed in. Both these problems can be perceived as annoying by the driver.

It is desirable to reduce considerably the abovementioned problems associated with the previous-known technology and to provide an armrest that makes possible an ergonomic work position for all operators, irrespective of their body size. It is also desirable that a reliable and simple folding away of the armrest be able to be carried out without the need for the arrangement of a new mechanism for carrying out the movement of the armrest between the operating position and the folded up passive position, and vice versa, without impairing the driver's freedom of movement.

According to a first embodiment, the invention comprises an armrest for a vehicle seat, which vehicle seat comprises a seat cushion and a backrest and where the armrest is intended to be turned around a pivot axis between a first active position above and essentially parallel to the said seat cushion and a second folded-away position alongside the said backrest. The armrest can preferably be mounted at the outer side of the vehicle seat in association with an exit or a door, but can also be mounted on both sides of the seat.

The armrest comprises an upper part or support surface, which in the active position is positioned with its longitudinal axis essentially parallel to an essentially vertical plane through a side surface constituting an outer edge surface of the vehicle seat and intended to support a user's forearm. In the following text, the position of the upper part in relation to the said plane will refer to the horizontal position outside and inside this plane in relation to the outer edge surface of the vehicle seat. In association with the invention, the essentially longitudinal axis of the support surface will be assumed to be principally parallel to the main side surface of the vehicle seat.

The support surface can also be provided with adjustment devices for rotating the support surface in the horizontal plane, with the object of making it possible to angle the armrest in relation to the user's elbow.

At least one lower part is provided with a fixing device for attaching the upper part to the vehicle seat. The lower part can thus comprise a single section attached directly to the vehicle seat or to a frame supporting this. Alternatively, the lower part can comprise a first section attached between the upper part and a second section, which second section is attached to the vehicle seat. The lower part is provided with a pivot axis at its lower end, around which pivot axis the armrest is arranged to fold. The pivot axis is positioned essentially at right angles to the longitudinal axis of the vehicle seat and can comprise an attachment to the frame of the vehicle seat or to a second lower part mounted on the frame of the vehicle seat.

The lower part preferably comprises a linking mechanism arranged for setting the upper part in a transverse direction between a first position outside the said side surface, from where the armrest can be folded away, and an adjustable second position, which position is set and locked by the user. For this purpose, the lower part is preferably provided with a locking device comprising a setting device that can be locked. The second position is preferably located displaced in an essentially horizontal direction towards the said seat cushion in relation to the said outer edge surface, whereby the upper part of the armrest is located completely or partially above the seat cushion. The linking mechanism is preferably provided with two parallel struts arranged to achieve an essentially horizontal lateral movement of the upper part when setting this. For this purpose, the parallel struts of the linking mechanism can pivot around two upper axes attached below the upper part of the armrest and around two lower axes attached in association with the pivot axis of the lower part. The upper and lower axes are preferably positioned parallel to the longitudinal axis of the seat cushion. The parallel struts can also be provided with at least one spring arrangement for spring-loading the linking mechanism towards the upper part's first position. This spring arrangement can be attached between the upper axis located closest to the user and the lower axis located furthest away from the user. In association with the pivot axis of the lower part, there is a locking device that is arranged to activate a catch that locks the upper part in a pre-set position, after movement of the upper part from the said first to the said second position. When folding the armrest from the active position to the folded-away position, the said locking device is arranged to release the upper part from its pre-set position and thereafter to allow movement of the armrest to its first position, for the purpose of enabling the armrest to be folded to its inactive position.

As the upper part of the armrest can be set in different positions by means of the lockable setting device by moving the upper part in a direction that has a component directed in the horizontal plane, so that the position of the support unit in a sideways direction in relation to the seat is variable, each user can select and set the most favourable distance between the seat and the support unit in order to achieve a comfortable working position that is suited to the size of their body. The said locking device preferably comprises an adjustable first locking arrangement that, in a first position, is arranged to engage with a locking lug in order to lock the linking mechanism in its preset position and that, in a second position, is arranged to be released from the said locking lug in order to return to the said first position. The locking lug is preferably attached to the vehicle seat or to its frame in association with the pivot axis of the armrest. The first locking arrangement comprises a lever with a pivot axis at right angles to the pivot axis of the armrest, one end of which lever has a contact surface that interacts with the said locking lug. The other end of the lever is provided with a fixing device in the form of the said lockable setting device, which setting device is arranged to be steplessly adjustable and to be able to be locked relative to the lower part, in order to allow the contact surface to be set in a position corresponding to the said second position. The setting of the said second position is suitably carried out by releasing the setting device and moving the armrest to the required position in relation to the vehicle seat, whereupon the setting device is locked. This setting results in a movement of the lever's contact surface in relation to the lower part, whereby the contact surface does not engage with the locking lug until the required position has been reached. When folding down the armrest, the user therefore does not need to repeat the setting of the upper part in the transverse direction. After folding the armrest to the active position, the user only needs to pull the spring-loaded upper part towards himself, from the first position to the set second position, whereupon the lever's contact surface will be automatically moved to make contact with and to be locked by the said locking lug.

According to a preferred embodiment, the armrest can be angled in relation to its pivot axis in such a way that it is held in place by its own weight, both in its folded-away position and in its folded-down active position. Accordingly, the armrest's pivot axis only needs to be provided with two stops that limit the angled movement of the armrest to comprise a sector between the required end positions.

Alternatively, the said locking device can comprise a second locking arrangement that is arranged, in a first position, to engage with a locking surface in association with the pivot axis of the armrest when the upper part is moved from its first position to its second position, and is arranged to be released when the upper part has been moved back to its first position. The second locking arrangement can be released automatically when the upper part has assumed its first position, or can be released manually by the action of the user in association with folding away the armrest. Another alternative embodiment of the second locking device comprises a manually-operated catch, preferably attached to the frame of the seat, which catch can be spring-loaded in engagement with the pivot axis of the armrest. The locking device above can also be designed to lock the armrest both in its folded-away position and in its folded-down active position.

The invention also relates to a vehicle seat comprising at least one armrest according to the description above, which armrest is mounted on the said vehicle seat by a fixing device, and a vehicle comprising a vehicle seat provided with at least one armrest.

Other advantages of the invention will be apparent from the following description.

BRIEF DESCRIPTION OF DRAWINGS

The invention will be described in greater detail in the following, with reference to embodiments that are shown in the attached schematic drawings, in which.

DESCRIPTION OF EMBODIMENTS

Figure 1:
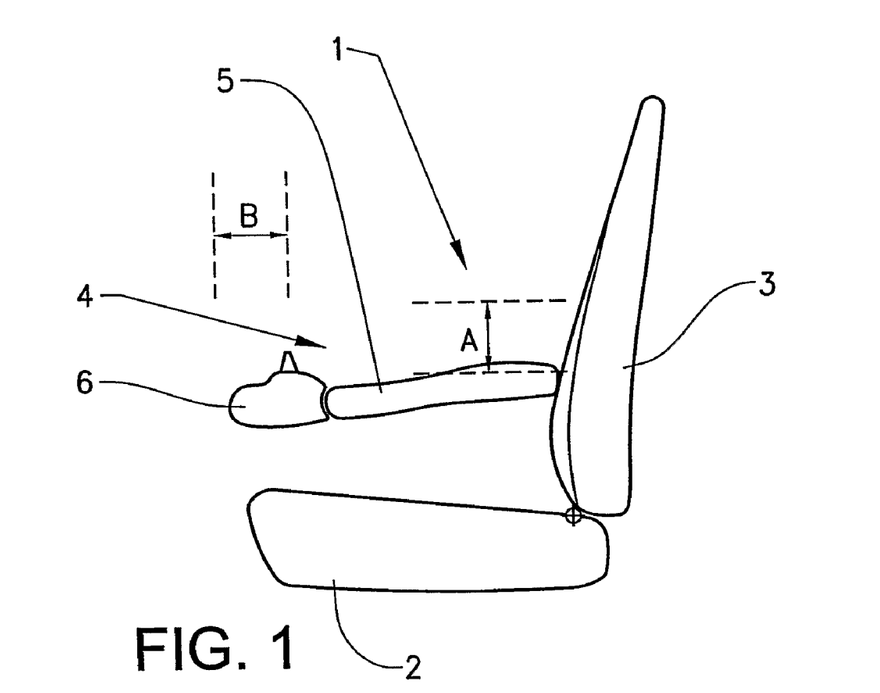
FIG. 1 shows a schematic side view of a vehicle seat according to the invention.
Figure 2:
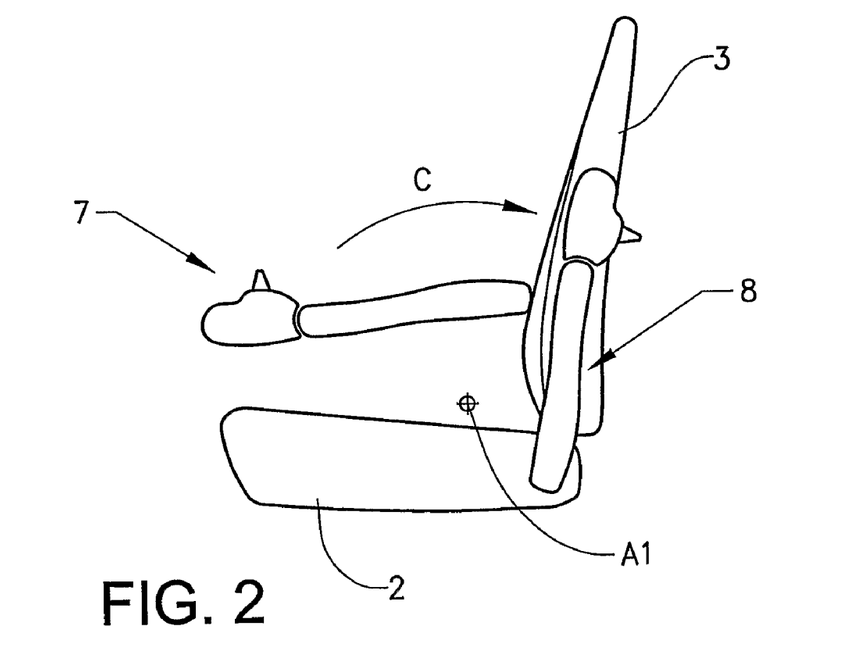
FIG. 2 shows a vehicle seat according to FIG. 1 with a foldable armrest.

FIG. 1 shows schematically a vehicle seat 1 comprising a seat cushion 2 and a back 3, and an armrest 4 according to the invention. The armrest 4 is adjustable in a conventional way vertically A and lengthways B in relation to the vehicle seat 1. The upper part of the armrest 4 consists of a rear part 5 that supports the forearm, and a front part 6 provided with a number of operating controls (not shown), against which part 6 the operator's hand rests. FIG. 2 illustrates how the armrest 4 can be folded from an active first position 7 to a folded-away second position 8 around a schematically-indicated pivot axis Ai as shown by the arrow C. In its folded-away position 8, the armrest 4 is positioned essentially parallel to the back 3 in order to make climbing into and out of the vehicle easier.

Figure 3:
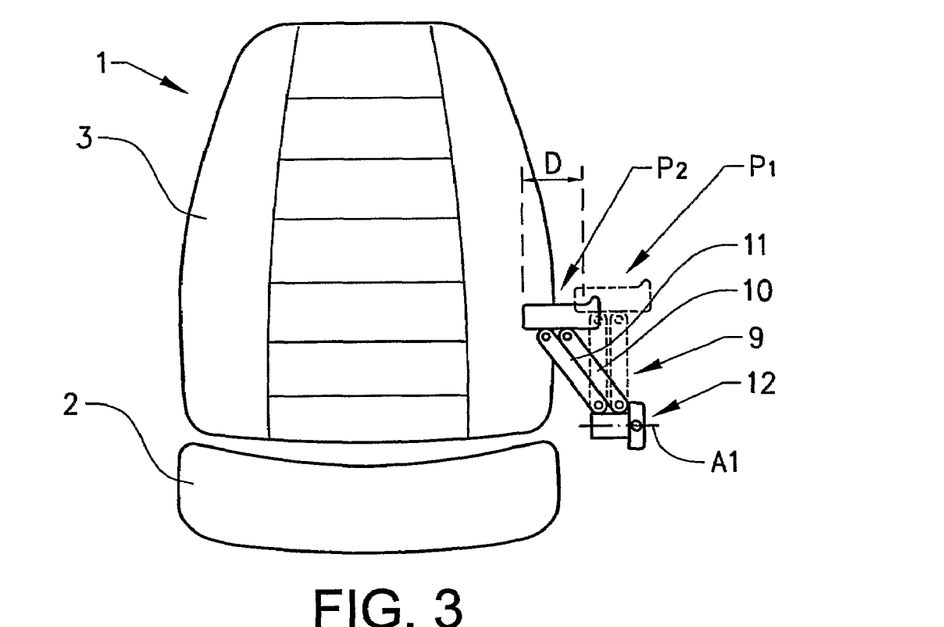
FIG. 3 shows a schematic front view of a vehicle seat according to the invention.

FIG. 3 shows a front view of the vehicle seat 1 with an armrest 4 in its active position. The armrest 4 is mounted on a lower section 9 that is attached around the pivot axis Ai in such a way that it can rotate. The lower section 9 comprises a parallel strut 10, 11, which strut allows a movement of the upper part 5, 6, of the armrest 4 in a transverse direction in relation to the essentially longitudinal axis X of the vehicle seat (see FIG. 4). Thus, the upper part 5, 6 can be moved a distance D from a first position Pi, in which the armrest 4 is outside a vertical plane (not shown) along the outer edge of the seat cushion 2 and of the back 3, to a second position P2 set by the operator. A locking device 12, which is described in greater detail below, is mounted in association with the pivot axis Ai.

Figure 4:
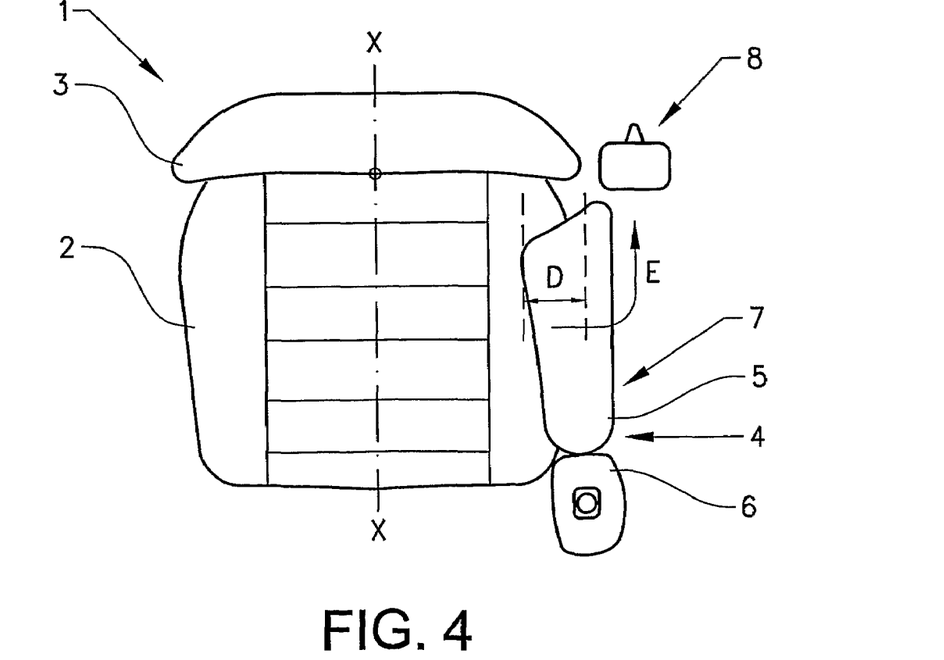
FIG. 4 shows a schematic plan view of a vehicle seat according to the invention.

FIG. 4 shows a plan view of the vehicle seat 1 with an armrest 4, where its upper part 5, 6 is in the active position 7, moved a distance D parallel to and in a direction towards the essentially longitudinal axis X of the seat. In order to fold the armrest 4 away, this must be released from its second position E>2, moved to its first position P1 and folded away from its active position 7 to its folded-away position 8, as indicated by the arrow E.

Figure 5:
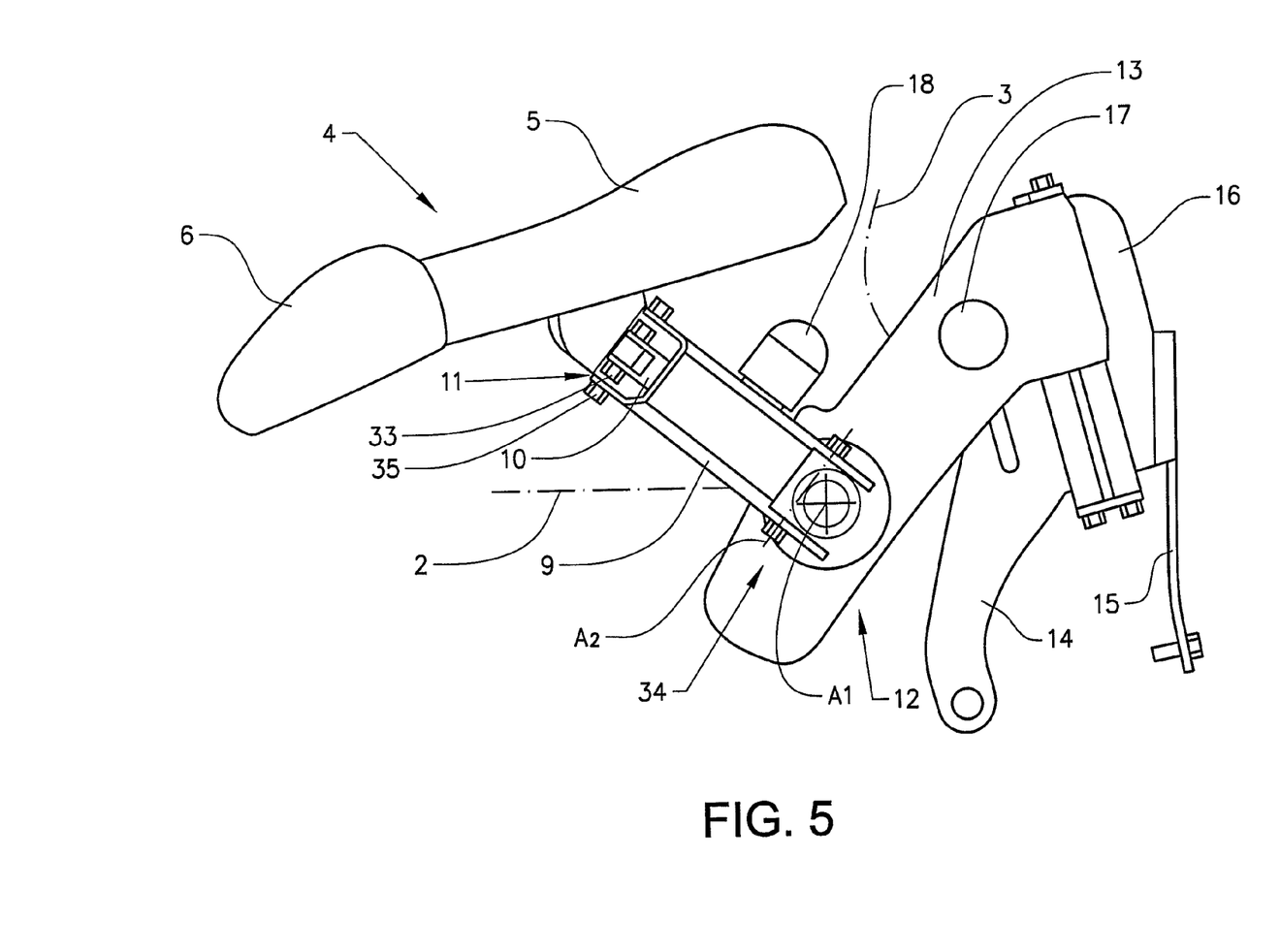
FIG. 5 shows a foldable armrest according to an embodiment of the invention.

FIG. 5 shows an armrest according to a preferred embodiment of the invention. Using the reference numerals from FIGS. 1-4, the armrest 4 has an upper part 5, 6 mounted on a lower part 9 comprising a parallel strut 10, 11. Accordingly, the length-adjusting function (see FIG. 1) of the upper part 5, 6 is incorporated in the fixing between the upper part 5, 6 and the lower part. The pivot axis A1 of the lower part 9 is, in turn, mounted on a bracket 13 in such a way that it can rotate, which bracket is provided with two fixing devices 14, 15 for mounting on the frame (not shown) of the vehicle seat. The approximate positions of the seat cushion 2 and the back 3 in relation to the armrest 4 are indicated by broken lines. The height of the bracket 13 can be set by means of an adjusting arrangement 16 that can be moved along two slides and locked in the required position by a locking device 17. The setting mechanisms for setting the position of the armrest in a lengthways direction and in a vertical direction are not a part of the invention and will not be described in greater detail.

The lower part 9 of the armrest is locked in position by a locking device 12, comprising a first locking arrangement for holding the upper part 5, 6 of the armrest in the set position in a transverse direction. The first locking arrangement can be released and locked by a setting device 18 for setting the upper part 5, 6 in a transverse direction. This locking arrangement will be described in detail below.

The armrest in the example illustrated in FIG. 5 is mounted on the vehicle seat by means of the bracket 13. In an alternative embodiment, the armrest could be attached to another part of the vehicle, for example to the floor of the vehicle, in the vicinity of the driver's seat.

Figure 6:
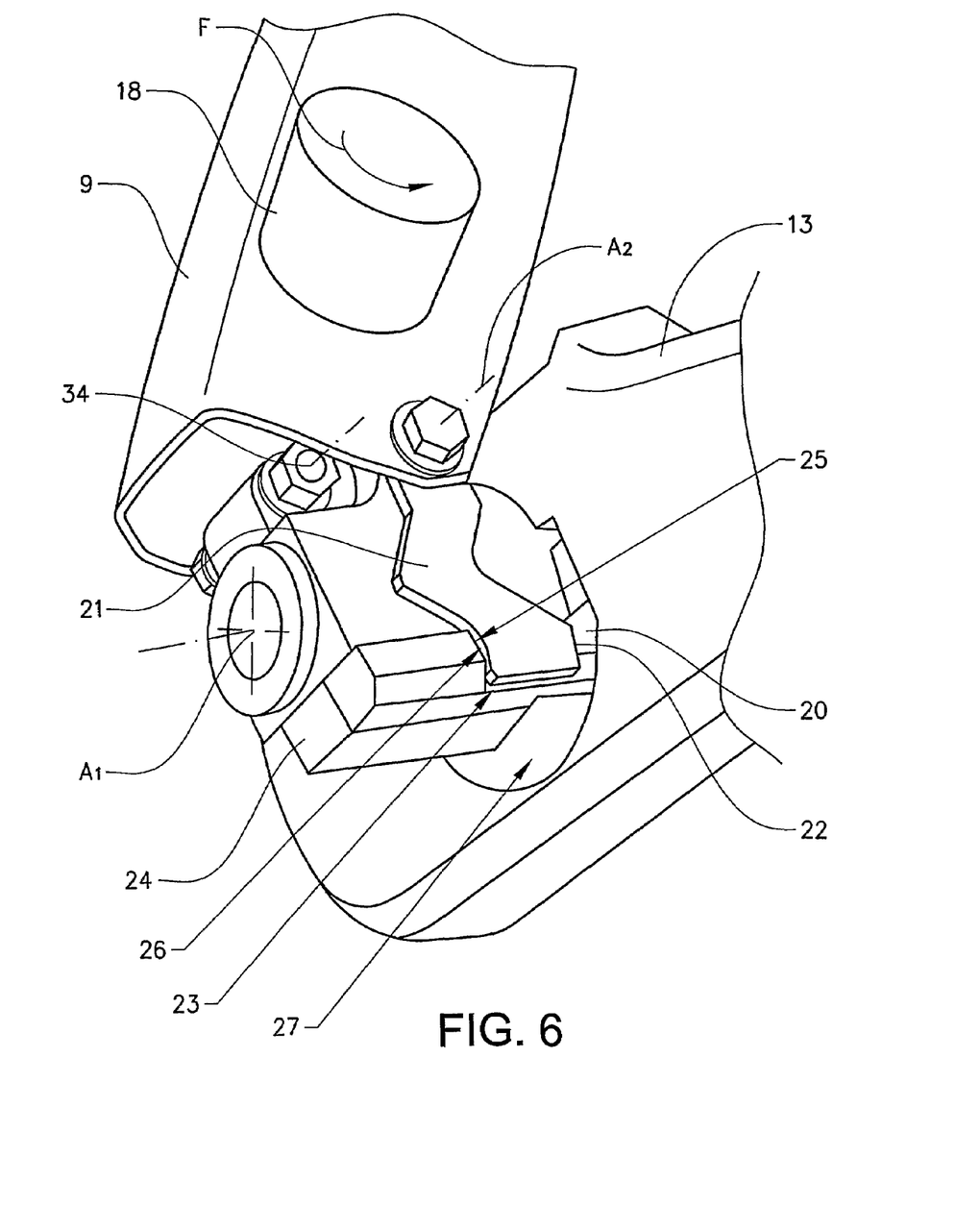
FIG. 6 shows a partial enlargement of the lower part of the armrest in the locked position.

FIG. 6 shows a partial enlargement of the lower part 9 and its first locking arrangement 19 when the upper part of the armrest is positioned in the position set by the user.

Figure 8:
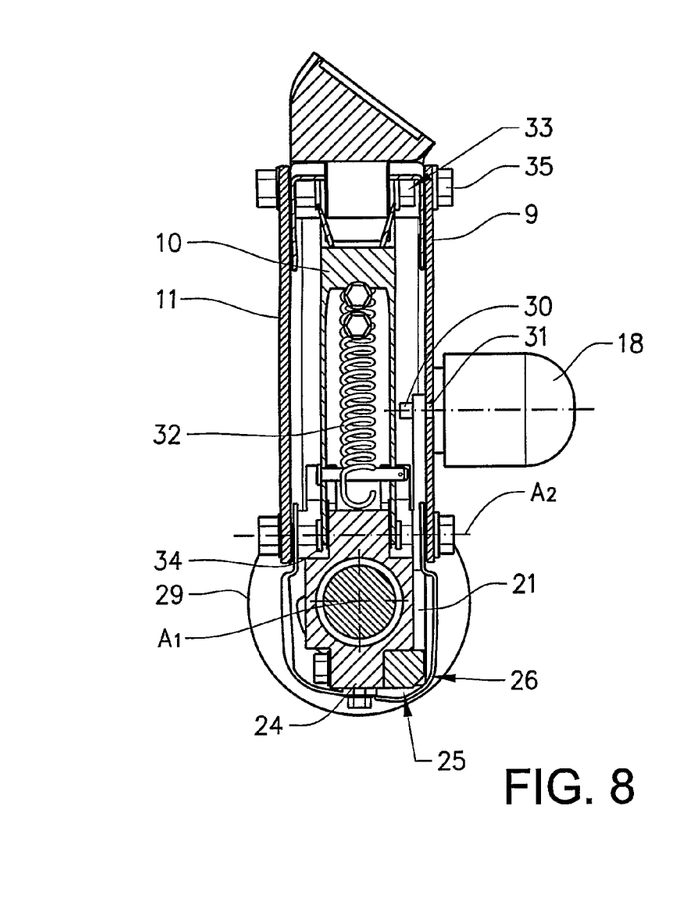
FIG. 8 shows a cross section through a side view of the lower part, as it appears in FIG. 5.

In its illustrated first position, the adjustable first locking arrangement 19 is arranged to engage with a locking lug 20 in order to lock the linking mechanism in its preset position and, in a second position, is arranged to be released from the said locking lug in order to return to the said first position. The locking lug 20 is preferably attached to the vehicle seat 13 in association with the pivot axis A1 of the armrest. The first locking arrangement 19 comprises a lever 21 with a pivot axis A2 at right angles to the pivot axis A1 of the armrest, the first end of which lever has a contact surface 22 that interacts with the said locking lug 20. In the active position illustrated, both the locking lug 20 and the first end of the lever are in contact with a common contact surface 23 on a fixing device 24 which comprises the pivot axis A1 of the lower part. The pivot axis Ax and the fixing device 24 surrounding the axis are mounted in an essentially circular opening 27 in the frame 13 of the vehicle seat in such a way that they can rotate. The contact surface 23 of the fixing device 24 is provided with a stop 25, the contact surface of which faces towards the locking lug 20 and is intended to make it possible to locate the second position rapidly. When the armrest approaches its preset second position, a second contact surface 26 facing away from the first contact surface 22 of the lever 21 comes into contact with the stop 25. At the same time, the lever's first contact surface 22 has passed the locking lug 20, whereby these are brought into contact with each other, by the armrest being angled forwards/downwards under its own weight, which causes a turning force around the pivot axis A1. In addition, the stop 25 prevents an unwanted movement of the armrest past the set second position. The second end of the lever 21 is provided with a fixing arrangement in the form of the said lockable setting device 18, which setting device is arranged to be steplessly adjustable and to be lockable in relation to the lower part 9, to make it possible to set the contact surface 22 in a position corresponding to the said second position. As shown in FIG. 8, the setting device 18 extends through an opening (not shown) in a U-shaped profile which constitutes the lower part 9. The setting device 18 is attached to the second end of the lever and, when tightened, can lock the position of the lever in relation to the lower part 9. A rotating axis in the setting device extends through the said opening parallel to the pivot axis A2 of the lever, which opening forms an arc-shaped slot with its centre around the pivot axis A2 of the lever 21. The lever 21 consists of an elongated element, one end of which extends downward at right angles to its pivot axis A2, past the end of the U-shaped profile and down in association with the locking lug 20 mounted on the vehicle seat. The second end of the lever extends upwards, along an inner wall of one leg of the U-shaped profile to the setting device 18. Setting of the second position of the upper part is suitably carried out by releasing the setting device 18, as indicated by the arrow F in FIG. 6, and moving the upper part to the required position in relation to the vehicle seat, whereupon the setting device 18 is locked. This setting involves a movement of the contact surface 22 of the lever in relation to the lower part 9, whereby the contact surface does not engage with the locking lug 20 until the required second position has been reached.

Therefore, when folding down the armrest, the user does not need to repeat the setting of the upper part in a transverse direction. After folding the armrest to the active position, the user only needs to pull the spring-loaded upper part 5, 6 towards himself, from the first position to the set second position. As a result of the turning force of the armrest around its pivot axis Aa, the contact surface 22 of the lever is automatically moved into contact with and locked by the said locking lug 20 when the said contact surface 22 goes past the locking lug 20.

Figure 7:
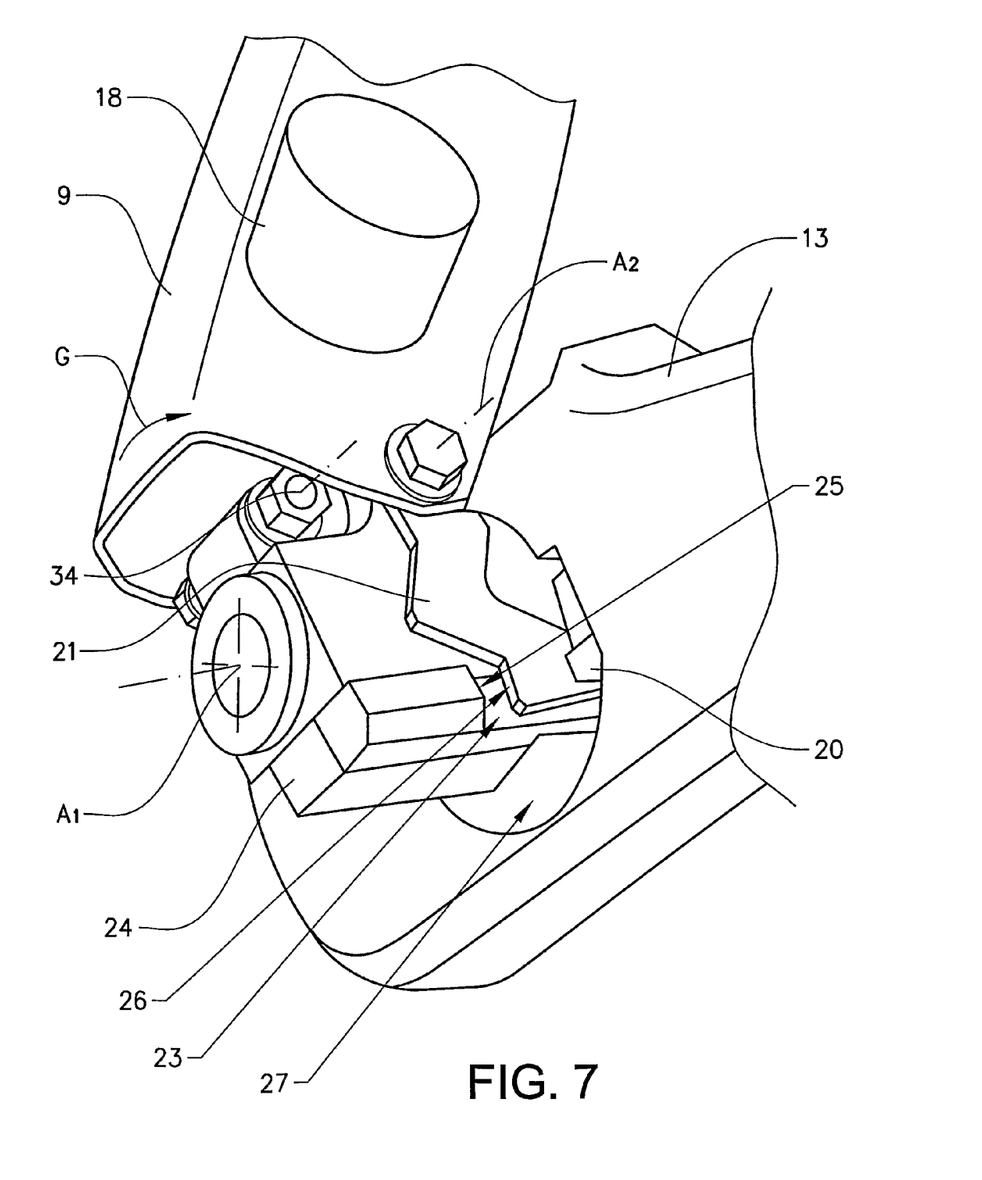
FIG. 7 shows a partial enlargement of the lower part of the armrest in the position for folding away.

FIG. 7 shows a partial enlargement of the lower part 9 and its first locking arrangement 19 when the upper part of the armrest is in the position for folding up.

In order to be able to fold away the armrest, the user must first release the upper part from its set second position and return it to the first position. This is achieved by the user taking hold of the armrest and angling it a short distance backwards, indicated by the arrow G. As this angling exceeds the thickness of the lever 21 in association with the locking lug 20, the lever 21 can be moved past the locking lug 20 along the contact surface 23 of the fixing device 24. This movement is carried out while the upper part of the armrest is moved from its set second position to its first position.

This movement is achieved by spring-loading the parallel struts 10, 11 in the lower part 9 that supports the upper part 5, 6 (see FIG. 3). If required, the movement can, of course, also be assisted or be carried out manually by the user.

FIG. 8 shows a cross section through the lower part 9, viewed in the same plane as the side view that is illustrated in FIG. 5. The figure shows a circular element 29 to which the fixing device 24 and the pivot axis Ai of the lower part are attached. This element 29 is intended to be mounted in a corresponding opening in the frame of the vehicle seat (see FIGS. 5 and 6). An inclined surface on the upper section of the lower part 9 forms an abutment for the upper part of the armrest (see FIG. 5). In addition, it shows how the axis 30 of the setting device 18 that can be rotated extends through the said opening 31 in the lower part 9, parallel to the pivot axis A2 of the lever, which opening constitutes an arc-shaped slot (see FIG. 9) with its centre around the pivot axis A2 of the lever 21. FIG. 8 also shows a spring arrangement in the form of a coil spring 32 for spring-loading the linking mechanism comprising parallel struts 10, 11 towards the first position of the upper part. The first parallel strut 10 runs inside the second parallel strut 11 which is formed by the U-shaped profile of the lower part. The first inner parallel strut 10 is attached between an upper axis 33 in the upper section of the lower part 9 and a lower axis 34 in the fixing device 24, outside the pivot axis A1 of the lower part. The second outer parallel strut 11 is attached between an upper axis 35 in the upper section of the lower part 9 and a lower axis constituting the pivot axis A1 of the lower part. The coil spring 32 is attached between the upper axis 35 of the outer parallel strut 10 and the lower axis 34 of the inner parallel strut 11. A movement of the upper part 5, 6 of the armrest in a direction towards the user will thereby be counteracted by the coil spring 32, which urges the upper part towards the first position of the armrest.

Figure 9:
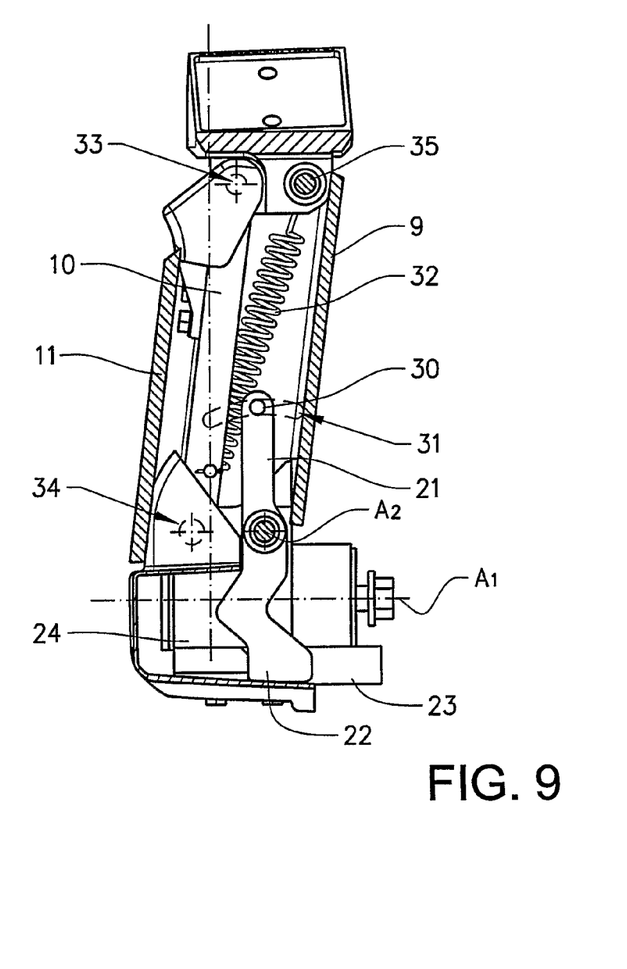
FIG. 9 shows a cross section at right angles to the lower part shown in FIG. 8.

FIG. 9 shows a cross section through the lower part 9 at right angles to the view that is shown in FIG. 8. The figure shows the diagonal attachment of the coil spring 32 between the upper axis 35 of the outer parallel strut 10 and the lower axis 34 of the inner parallel strut 11. In addition, the opening 31 in the lower part 9, that interacts with the axis 30 of the setting device 18 that can be rotated, is indicated (broken lines).

The invention is not limited to the embodiments described above, but can be varied freely within the framework of the following claims.

The invention claimed is:

1. An armrest for a vehicle seat, the vehicle seat comprising a seat cushion and a backrest, the armrest being adapted to be turned around a pivot axis between a first active position above and substantially parallel to the seat cushion and a second folded-away position substantially parallel to the backrest, the armrest comprising:
   an upper part, the upper part having a longitudinal axis and, in the first active position, the upper part being positioned with its longitudinal axis substantially parallel to an substantially vertical plane through a side surface defining an outer edge surface of the vehicle seat, the upper part being adapted to support a user's forearm;
   at least one lower part provided with a fixing device for attaching the upper part to the vehicle seat, the lower part comprising a linking mechanism arranged for setting the upper part in a transverse direction between a first position outside the side surface and an adjustable second position when the armrest is in its active position; and
   a locking device arranged to activate a catch that locks the upper part in a set position after it has been moved to the adjustable second position.

2. The armrest as claimed in claim 1, wherein the locking device comprises an adjustable first locking arrangement that, in a first position of the first locking arrangement, is arranged to engage with a locking lug in order to lock the linking mechanism in a preset position and, in a second position of the first locking arrangement, is arranged to be released from the locking lug in order to return to the first position.

3. The armrest as claimed in claim 2, wherein the linking mechanism is provided with parallel struts arranged to achieve an substantially horizontal movement of the upper part when setting the upper part.

4. The armrest as claimed in claim 3, wherein the parallel struts are provided with at least one spring arrangement for spring-loading the linking mechanism towards the first active position of the upper part.

5. The armrest as claimed in claim 2, wherein the first locking arrangement comprises a lever with a pivot axis at right angles to the pivot axis of the armrest, one end of which lever has a contact surface that interacts with the locking lug.

6. The armrest as claimed in claim 5, wherein the linking mechanism is provided with parallel struts arranged to achieve an substantially horizontal movement of the upper part when setting the upper part.

7. The armrest as claimed in claim 6, wherein the parallel struts are provided with at least one spring arrangement for spring-loading the linking mechanism towards the first active position of the upper part.

8. The armrest as claimed in claim 5, wherein another end of the lever is provided with a setting device that is arranged to be steplessly adjustable and to be able to be locked relative to the lower part, in order to allow the contact surface to be set in relation to the locking lug.

9. The armrest as claimed in claim 8, wherein the linking mechanism is provided with parallel struts arranged to achieve an substantially horizontal movement of the upper part when setting the upper part.

10. The armrest as claimed in claim 9, wherein the parallel struts are provided with at least one spring arrangement for spring-loading the linking mechanism towards the first active position of the upper part.

11. The armrest as claimed in claim 1, wherein the linking mechanism is provided with parallel struts arranged to achieve an substantially horizontal movement of the upper part when setting the upper part.

12. The armrest as claimed in claim 11, wherein the parallel struts are provided with at least one spring arrangement for spring-loading the linking mechanism towards the first active position of the upper part.

13. A vehicle seat comprising at least one armrest as claimed in claim 1, mounted on the vehicle seat by a fixing device.

14. A vehicle comprising a vehicle seat provided with at least one armrest as claimed in claim 1.

* * * * *